United States Patent
Trohel et al.

(10) Patent No.: US 10,294,820 B2
(45) Date of Patent: May 21, 2019

(54) DEVICE FOR PROTECTING AGAINST OIL LEAKS TOWARDS THE ROTORS OF A TURBOMACHINE TURBINE

(71) Applicant: SAFRAN AIRCRAFT ENGINES, Paris (FR)

(72) Inventors: Mathieu Jean Pierre Trohel, Saint Vrain (FR); Eddy Stephane Joel Fontanel, Palaiseau (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 418 days.

(21) Appl. No.: 14/904,557

(22) PCT Filed: Jul. 10, 2014

(86) PCT No.: PCT/FR2014/051782
§ 371 (c)(1),
(2) Date: Jan. 12, 2016

(87) PCT Pub. No.: WO2015/007980
PCT Pub. Date: Jan. 22, 2015

(65) Prior Publication Data
US 2016/0169041 A1   Jun. 16, 2016

(30) Foreign Application Priority Data

Jul. 16, 2013 (FR) ..................... 13 57001

(51) Int. Cl.
*F01D 25/16* (2006.01)
*F01D 25/18* (2006.01)
*F02C 7/28* (2006.01)

(52) U.S. Cl.
CPC .......... *F01D 25/183* (2013.01); *F01D 25/16* (2013.01); *F01D 25/18* (2013.01); *F02C 7/28* (2013.01);
(Continued)

(58) Field of Classification Search
CPC ........ F01D 25/18–25/20; F01D 25/125; F01D 25/183; F01D 25/16; F02C 7/06; F05D 2260/6022; F05D 2260/98
See application file for complete search history.

(56) References Cited

U.S. PATENT DOCUMENTS 3,844,110 A * 10/1974 Widlansky ................ F02C 7/06
                                                        60/39.08
5,088,742 A *  2/1992 Catlow .................... F01D 11/02
                                                        277/430
(Continued)

FOREIGN PATENT DOCUMENTS

EP       2 090 764 A1   8/2009
WO    2012/069772 A1   5/2012

OTHER PUBLICATIONS

International Search Report dated Dec. 15, 2014 in PCT/FR14/51782 filed Jul. 10, 2014.

*Primary Examiner* — Justin D Seabe
*Assistant Examiner* — Julian B Getachew
(74) *Attorney, Agent, or Firm* — Oblon, McClelland, Maier & Neustadt, L.L.P.

(57) ABSTRACT

A device for protecting against oil leaks towards the rotors of a turbomachine turbine includes an upstream cavity in which an oil/air mixture can circulate, the upstream cavity being delimited downstream by a journal of the turbine rotor and on the outside by a sealing flange of the journal extending axially in an upstream direction, a downstream cavity opening towards the discs of the turbine and communicating with the upstream cavity via a plurality of ventilation holes provided in the journal, and an upstream annular deflector fixed to the sealing flange of the journal and extending radially inwards towards the ventilation holes (Continued)

The upstream deflector has oil passage ports provided at the end of same secured to the sealing flange of the journal.

14 Claims, 2 Drawing Sheets

(52) U.S. Cl.
CPC ...... *F05D 2220/30* (2013.01); *F05D 2240/24* (2013.01); *F05D 2240/60* (2013.01); *F05D 2260/609* (2013.01)

(56) References Cited

U.S. PATENT DOCUMENTS

| | | | |
|---|---|---|---|
| 8,312,702 B2* | 11/2012 | Bart ................. | F01D 25/16 |
| | | | 184/43 |
| 2007/0193276 A1* | 8/2007 | Corattiyil ............ | F02C 7/06 |
| | | | 60/782 |
| 2009/0133581 A1* | 5/2009 | Fang .................. | B01D 45/14 |
| | | | 96/216 |
| 2009/0199534 A1 | 8/2009 | Bart et al. | |
| 2013/0247538 A1 | 9/2013 | Roche et al. | |
| 2015/0147157 A1* | 5/2015 | Fontanel ............. | F01D 25/18 |
| | | | 415/110 |

* cited by examiner

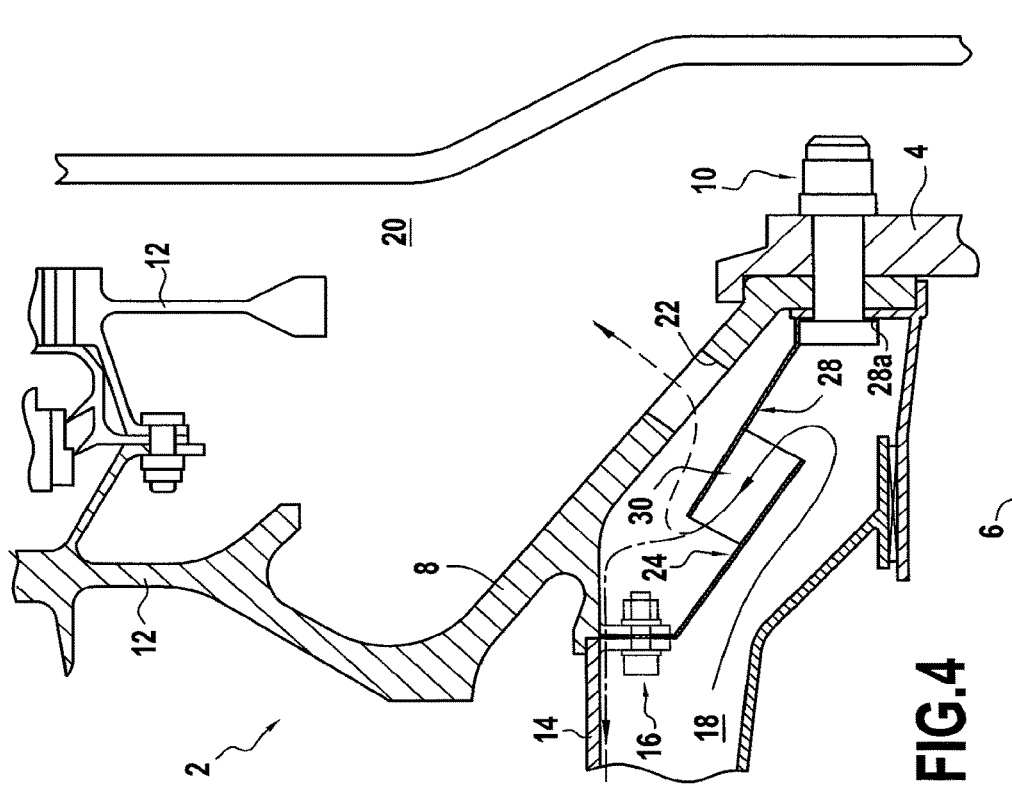
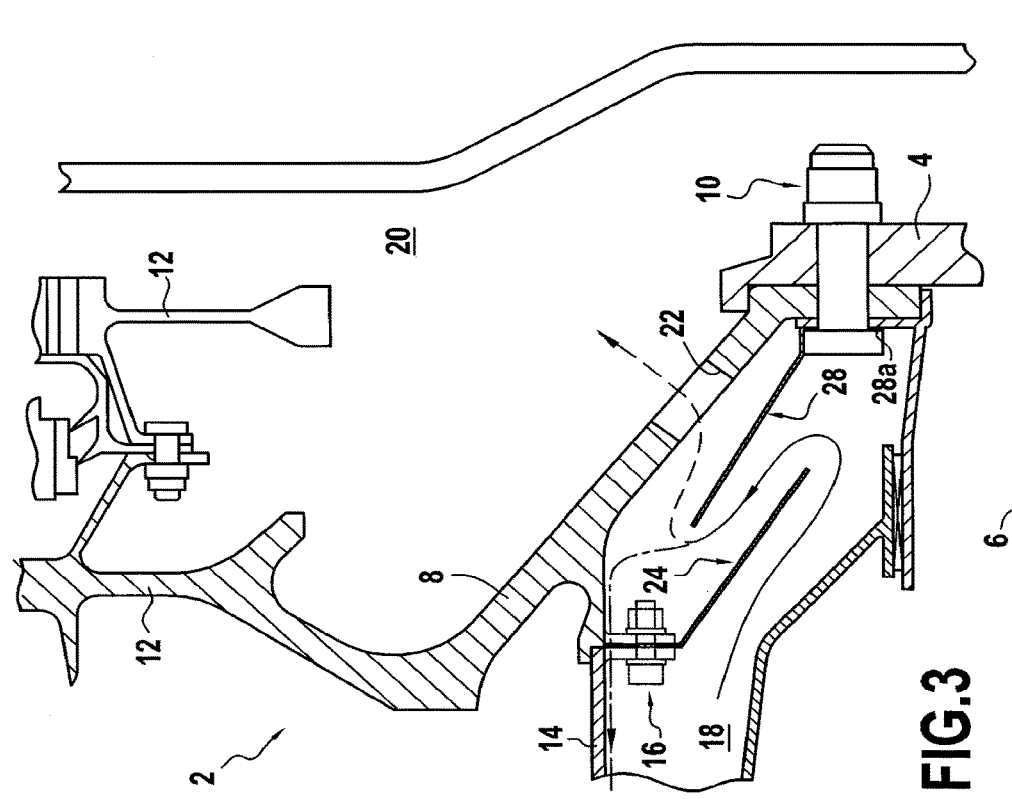

DEVICE FOR PROTECTING AGAINST OIL LEAKS TOWARDS THE ROTORS OF A TURBOMACHINE TURBINE

BACKGROUND OF THE INVENTION

The present invention relates to the general field of turbines of a turbomachine, and especially of the low-pressure turbine. It also relates more precisely to a device for protecting the rotors of a turbine against the risks of an oil fire.

The low-pressure shaft of a turbomachine drives in rotation the different stages of the low-pressure turbine by means of a journal fixed on the low-pressure shaft. This journal delimits upstream an inner upstream cavity in which air travels intended to ventilate the different discs of the low-pressure turbine arranged downstream from this journal.

To this end, the journal of the low-pressure shaft has ventilation holes enabling ventilation air taken upstream in the motor to feed an outer downstream cavity by transiting via an inner upstream cavity. This ventilation air is then guided towards the discs of the different stages of the low-pressure turbine downstream of the journal to cool them.

Also, it is possible for oil originating from leaks of the lubrication circuit and oil containers of the turbomachine to also be present in the inner upstream cavity of the low-pressure turbine. This oil tends to mix with the ventilation air and borrow the same path as the latter, to end up in the downstream cavity of the low-pressure turbine.

The environment of this downstream cavity is relatively hot, which can cause an oil fire in this cavity with all the harmful consequences this could engender.

OBJECT AND SUMMARY OF THE INVENTION

The principal aim of the present invention therefore is to eliminate such drawbacks by proposing a device for protecting the rotors of the turbine against the risks of an oil fire.

To this end, a device for protecting against oil leaks towards the rotors of a turbomachine turbine is provided, comprising an upstream cavity in which an air/oil mixture can circulate, said upstream cavity being delimited downstream by a journal of the turbine rotor and to the outside by a sealing flange of the journal axially extending towards upstream, and a downstream cavity opening towards the discs of the turbine and communicating with the upstream cavity by a plurality of ventilation holes made in the journal, and further comprising according to the invention an annular upstream deflector fixed on the sealing flange of the journal and radially extending towards the inside in the direction of the ventilation holes, the upstream deflector exhibiting oil flow orifices made at the level of its end fixed on the sealing flange of the journal.

The presence of the upstream deflector minimises the quantity of oil moving from the upstream cavity to the downstream cavity. In fact, this upstream deflector especially forms an obstacle to the direct trajectory of the air/oil mixture passing through the ventilation holes made in the journal.

Also, the positioning of this upstream deflector ensures separation between the trajectory of the air and the trajectory of the oil. In particular, under the effect of the pressure differential between the upstream cavity and the downstream cavity the air of the air/oil mixture will tend to pass under the upstream deflector and travel as far as the downstream cavity by passing through the ventilation holes. As for the oil of the air/oil mixture, once it passes the upstream deflector under the effect of the rotary centrifugal force of the journal it will tend to press against the inner wall of the sealing flange of the journal and rise upstream along the latter. The presence of oil flow orifices at the level of the end of the upstream deflector which is fixed on the sealing flange of the journal allows the oil to be evacuated upstream of the upstream cavity, without encountering countercurrent airflow.

In this way, the device according to the invention produces deoiling of the air/oil mixture present in the upstream cavity with the oil which is evacuated upstream to be recovered and the air which feeds the downstream cavity to ventilate the rotors of the turbine.

Preferably, the upstream deflector radially extends towards the inside so as to mask the ventilation holes made in the journal.

Preferably also, the upstream deflector comprises a fixing flange which is fixed on the sealing flange of the journal by means of fastening systems of the sealing flange of the journal on the journal. In this case, the oil flow orifices are advantageously made in the fixing flange of the upstream deflector and angularly positioned between the fastening systems of the sealing flange of the journal on the journal.

More preferably, the device further comprises a downstream annular deflector fixed on the journal and radially extending towards the outside in the direction of the ventilation holes so as to delimit with the upstream deflector a baffle for the air/oil mixture circulating in the upstream cavity. The presence of such a baffle favours separation between the air and the oil of the air/oil mixture and accentuates the centrifuging of the oil on the inner wall of the sealing flange of the journal.

In this case, the downstream deflector extends advantageously radially towards the outside so as to mask the ventilation holes. This masking favours the capturing on the upstream deflector of any direct projections of oil.

Similarly, the downstream deflector is advantageously axially interposed between the upstream deflector and the ventilation holes made in the journal.

The device can further comprise stiffeners ensuring a link between free ends of the upstream and downstream deflectors.

The downstream deflector can comprise a fixing flange which is fixed on the journal by means of fastening systems of the journal on a turbine shaft.

Another aim of the invention is a turbomachine turbine comprising a device for protecting against oil leaks such as defined previously. Yet another aim of the invention is a turbomachine comprising such a turbine.

BRIEF DESCRIPTION OF THE DIAGRAMS

Other characteristics and advantages of the present invention will emerge from the following description in reference to the appended drawings which illustrate embodiments devoid of any limiting character, in which:

FIGS. 3 and 4 are schematic views of devices for protecting against oil leaks according to variant embodiments of the invention.

DETAILED DESCRIPTION OF THE INVENTION

Figure 1:
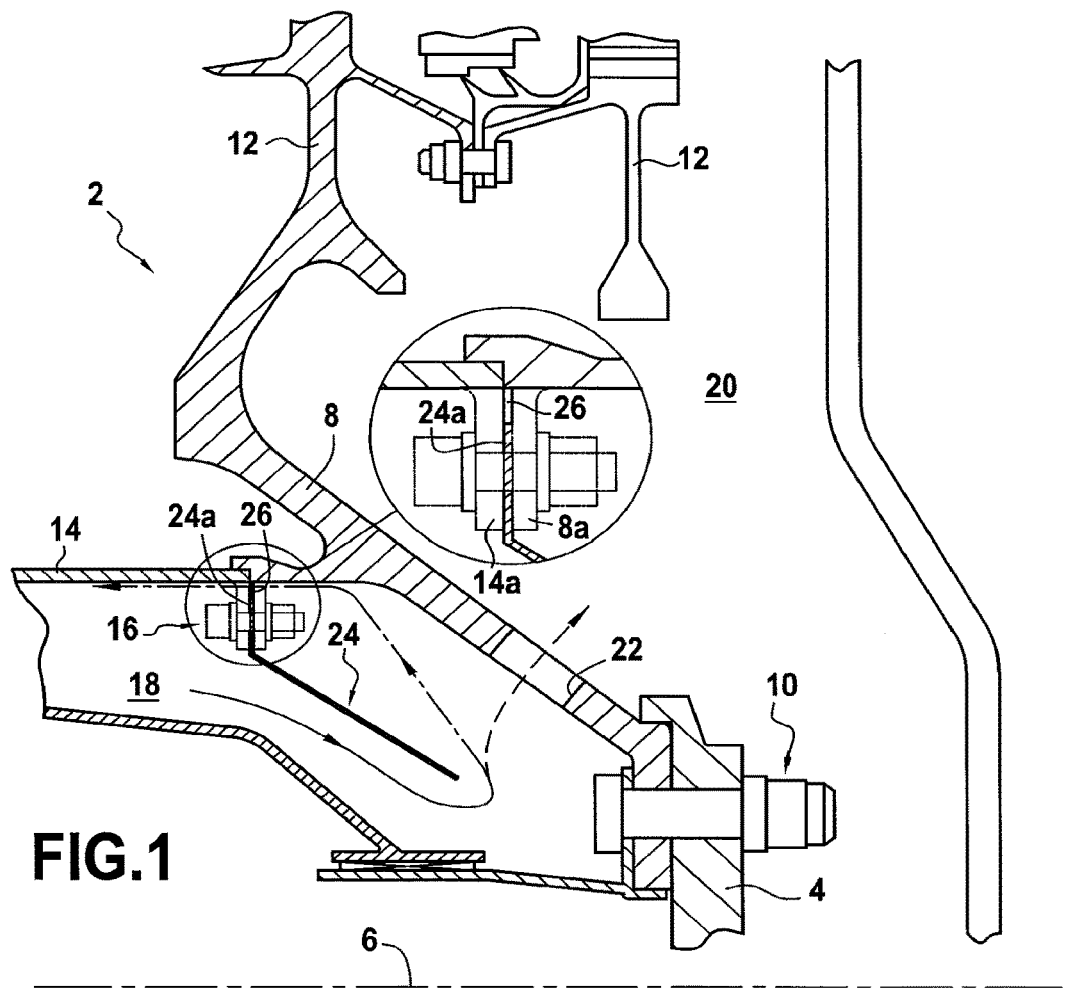
FIG. 1 is a schematic view of a device for protecting against oil leaks according to the invention.

FIG. 1 schematically and partially shows a low-pressure turbine 2 of a turbomachine equipped with a device for protecting against oil leaks according to the invention. Of course, the invention applies to any turbomachine turbine.

As is known per se, the low-pressure turbine 2 comprises a low-pressure 4 shaft centred on a longitudinal axis 6 of the turbomachine.

For the rest of the description, the terms "upstream" and "downstream" will be used relative to the direction of flow of the gas flow passing through the turbomachine. Similarly, the terms "inside" and "outside" will be used relative to the longitudinal axis 6 of the turbomachine.

Fixed to the low-pressure shaft 4 is the inner radial end of a journal 8 by means of a plurality of fastening systems 10, for example of the screw/nut type. At the level of its opposite radial end, the journal 8 is attached to a rotor disc 12 of a stage of the low-pressure turbine which it drives in rotation around the longitudinal axis 6. As shown in FIG. 1, this rotor disc 12 is connected to the rotor discs 12 of the other stages of the low-pressure turbine.

The journal 8 of the low-pressure turbine also comprises a sealing flange 14 which extends axially upstream. This sealing flange 14 bears a sealing device (for example a labyrinth seal, not shown in the figures). This sealing flange can be fixed to the journal by means of a plurality of fastening systems 16, for example of screw/nut type.

The journal 8 of the low-pressure turbine (and its sealing flange 14) delimits two cavities, specifically an upstream cavity 18 and a downstream cavity 20.

More precisely, the upstream cavity 18 is formed on the inner side and is delimited on the one hand radially to the outside by the sealing flange 14 of the journal, and on the other hand axially downstream by the journal itself. As for the downstream cavity 20, it is formed on the outer side and is delimited on the one hand axially to the upstream by the journal and on the other hand radially to the outside by the rotor discs 12.

The upstream 18 and downstream 20 cavities communicate with each other by means of a plurality of ventilation holes 22 made in the journal 8 and uniformly distributed around the longitudinal axis 6 of the turbomachine. As is known, the downstream cavity 20 terminates towards ventilation circuits of the rotor discs of the different stages of the low-pressure turbine (not shown in the figures).

Air taken upstream in the turbomachine feeds the upstream cavity 18 to then move to the downstream cavity 20 (by setting up a pressure differential between the two cavities) where it is used to feed the ventilation circuits of the rotor discs.

Also, it is possible for oil originating from leaks of the lubrication circuit and oil containers of the turbomachine (not shown in the figures) also ends up in the upstream cavity 18. Now, this oil does not have to end up in the downstream cavity 20 to avoid any risk of triggering a fire.

To this end, in keeping with the invention an annular upstream deflector 24 is provided which is fixed on the sealing flange 14 of the journal. This upstream deflector 24 is for example formed from sheet metal and radially extends towards the inside in the direction of the ventilation holes 22 made in the journal so as to mask them.

Figure 2:
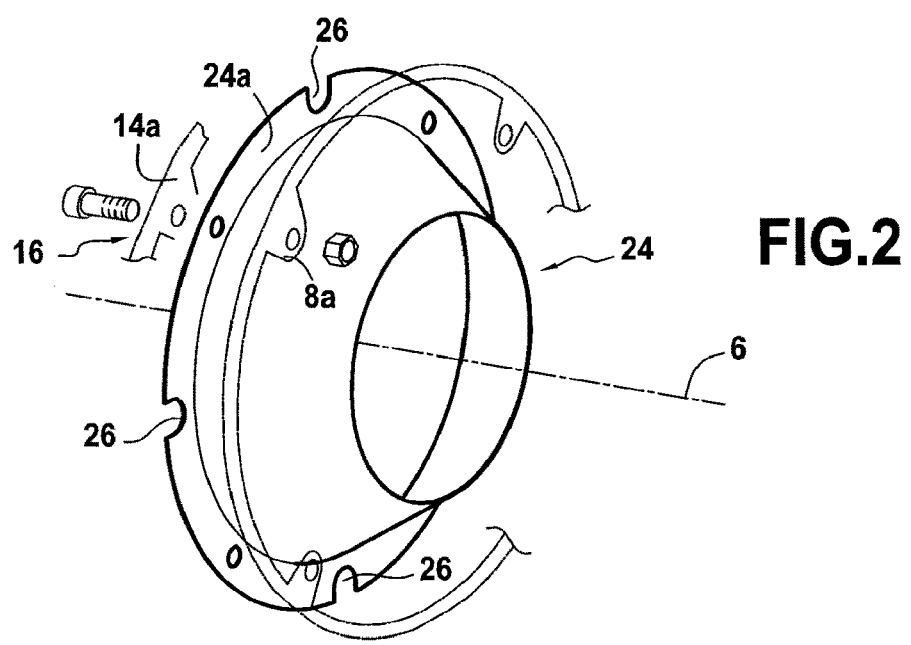
FIG. 2 is a perspective view of the upstream deflector of the device for protecting of FIG. 1.

Also, as shown in FIG. 2, the upstream deflector 24 has oil flow orifices 26 which are made at the level of its end fixed on the sealing flange 14 of the journal.

More precisely, the upstream deflector 24 comprises a fixing flange 24a which can be fixed on the sealing flange 14 of the journal by means of fastening systems 16 of the sealing flange on the journal. To this end, the sealing flange 14 of the journal and the journal 8 have scallops, respectively 14a and 8a, which are fixed together by the fastening systems 16.

The oil passage holes 26 are made in the fixing flange 24a of the upstream deflector 24 and are angularly positioned between the respective scallops 14a, 8a of the sealing flange 14 of the journal and of the journal 8.

These oil passage holes 26 can be uniformly distributed around the longitudinal axis 6 of the turbomachine and their number and their dimensions are adapted especially as a function of the quantity of oil to be evacuated.

The fixing flange 24a of the upstream deflector 24 also ensures masking of the areas angularly located between the respective scallops 8a, 14a of the journal and its sealing flange so as to force the passage of air to pass through the inside of the upstream deflector.

Preferably, the dimension of the oil passage holes 26 is relatively small so that they can rapidly be "filled" of oil and avoid any passage of air. The passage of air at the level of the end of the upstream deflector which is fixed on the sealing flange of the journal is also prohibited by the presence of the fixing flange 24a of the deflector which forms an obstacle to such passage.

In this way, the upstream deflector 24 masks the ventilation holes 22 made in the journal 8, preventing the air/oil mixture flowing in the upstream cavity 18 from passing through these ventilation holes to join the downstream cavity 20.

Instead, the air/oil mixture (its trajectory is traced by a solid line in FIG. 1) bypasses the upstream deflector. When leaving the upstream deflector and under the effect of the centrifugal rotation force of the journal 8, this air/oil mixture separates into an oil trajectory (traced by mixed lines) which presses against the inner wall of the sealing flange 14 of the journal 8 and rises upstream along the latter, especially by borrowing the oil passage holes 26 made in the fixing flange 24a of the upstream deflector, and into an air trajectory (traced by dotted lines) which borrows the ventilation holes 22 made in the journal under the effect of the pressure differential in between the upstream and downstream cavities.

The deoiled air enters the downstream cavity and can feed the ventilation circuits of the rotor discs of the different stages of the low-pressure turbine. As for the oil recovered against the inner wall of the sealing flange of the journal, it travels upstream along this wall under the effect of the centrifugal force and can be recovered further upstream, for example by means of scoops (not shown in the figures).

FIG. 3 shows a variant embodiment of the device for protecting against oil leaks according to the invention.

This device for protecting is identical to that described in conjunction with FIGS. 1 and 2 and further comprises a downstream annular deflector 28 which is fixed on the journal 8. The downstream deflector 28 is for example formed from sheet metal and radially extends towards the outside in the direction of the ventilation holes 22 made in the journal 8 so as to mask them.

More precisely, this downstream deflector 28 is axially interposed between the upstream deflector 24 and the ventilation holes 22 and forms with the upstream deflector a baffle for the air/oil mixture circulating in the upstream cavity 18 (its trajectory is traced by a solid line).

The downstream deflector 28 comprises a fixing flange 28a which can be fixed on the journal 8 by means of fastening systems 10 of the journal 8 on the low-pressure shaft 4.

So by masking the ventilation holes 22, the upstream 24 and downstream 28 deflectors prevent the air/oil mixture flowing in the upstream cavity 18 from directly passing through these ventilation holes to join the downstream cavity 20.

When leaving the baffle formed by the deflectors 24, 28, and under the effect of the centrifugal rotation force of the journal, the air/oil mixture separates into an oil trajectory (traced by mixed lines) which presses against the inner wall of the sealing flange 14 of the journal and rises upstream along the latter, especially by, and into an air trajectory (traced by dotted lines) which borrows the ventilation holes 22 under the effect of the pressure differential in between the upstream and downstream cavities.

The deoiled air enters the downstream cavity and can feed the ventilation circuits of the rotor discs of the different stages of the low-pressure turbine. As for the oil recovered against the inner wall of the sealing flange of the journal, it travels upstream along this wall under the effect of the centrifugal force and can be recovered further upstream.

FIG. 4 shows another variant embodiment of the device for protecting against oil leaks according to the invention.

The device according to this variant is identical to that described in conjunction with FIG. 3 and further comprises stiffeners 30 ensuring a link between free ends of the upstream 24 and downstream 28 deflectors (that is, their ends opposite the fixing flange).

These stiffeners 30 can be simples metal sheets fixed at the free ends of the deflectors 24, 28 and angularly spaced to each other to allow passage of the air/oil mixture. They impart a certain mechanical hold on the device for resulting protection.

The invention claimed is:

1. A device for protecting a rotor of a turbine of a turbomachine against oil leaks of the turbomachine, comprising:
   an upstream cavity in which an air/oil mixture can circulate, said upstream cavity being delimited downstream by a journal of the rotor of the turbine and radially outward by a sealing flange axially extending upstream; and
   a downstream cavity opening towards the rotor of the turbine and communicating with the upstream cavity by a plurality of ventilation holes made in the journal to feed air in the rotor of the turbine; and
   an annular upstream deflector fixed on the sealing flange of the journal and radially extending towards the plurality of ventilation holes, the upstream deflector having oil flow orifices located at an end of the upstream deflector fixed on the sealing flange of the journal for preventing the air/oil mixture to flow in the downstream cavity through the plurality of ventilation holes.

2. The device according to claim 1, wherein the upstream deflector radially extends so as to mask the plurality of ventilation holes made in the journal.

3. The device according to claim 1, wherein the upstream deflector comprises a fixing flange which is fixed on the sealing flange of the journal by fastening systems of the sealing flange on the journal.

4. The device according to claim 3, wherein the oil flow orifices are made in the fixing flange of the upstream deflector and angularly positioned between the fastening systems of the sealing flange on the journal.

5. The device according to claim 1, further comprising a downstream annular deflector fixed on the journal and radially extending towards the plurality of ventilation holes so as to delimit with the upstream deflector a baffle for the air/oil mixture circulating in the upstream cavity.

6. The device according to claim 5, wherein the downstream deflector radially extends so as to mask the plurality of ventilation holes.

7. The device according to claim 5, the downstream deflector is axially interposed between the upstream deflector and the plurality of ventilation holes made in the journal.

8. The device according to claim 5, further comprising stiffeners ensuring a link between free ends of the upstream and downstream deflectors.

9. The device according to claim 5, wherein the downstream deflector comprises a fixing flange which is fixed on the journal by fastening systems of the journal on a turbine shaft.

10. A turbine of a turbomachine comprising a device for protecting a rotor against oil leaks according to claim 1.

11. A turbomachine comprising the turbine according to claim 10.

12. The device according to claim 1, wherein the upstream deflector includes an upstream radial portion on which the oil flow orifices are provided, and a downstream frustoconical portion extending downstream from a radially inner end of the upstream radial portion.

13. The device according to claim 12, wherein a first upstream end of the upstream deflector is fixed on the sealing flange of the journal, and a second downstream end of the upstream deflector is free.

14. The device according to claim 13, wherein the plurality of ventilation holes is made on a frustoconical portion of the journal, and the second downstream end of the upstream deflector overlaps a portion of the plurality of ventilation holes in a direction parallel to the frustoconical portion of the journal.

* * * * *